United States Patent
Lee et al.

(10) Patent No.: US 10,527,767 B2
(45) Date of Patent: Jan. 7, 2020

(54) POLARIZING PLATE, COMPOSITION FOR PROTECTIVE LAYERS OF A POLARIZING PLATE, AND OPTICAL DISPLAY INCLUDING THE SAME

(71) Applicant: SAMSUNG SDI CO., LTD., Yongin-si, Gyeonggi-do (KR)

(72) Inventors: Do Heon Lee, Uiwang-si (KR); Mi Yeon Yu, Uiwang-si (KR); Tae Hyun Lee, Uiwang-si (KR); In Cheon Han, Uiwang-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 514 days.

(21) Appl. No.: 14/838,321

(22) Filed: Aug. 27, 2015

(65) Prior Publication Data

US 2016/0062016 A1    Mar. 3, 2016

(30) Foreign Application Priority Data

Aug. 29, 2014 (KR) .................. 10-2014-0114587

(51) Int. Cl.
*G02B 5/30* (2006.01)
*G02F 1/1335* (2006.01)
*C09D 133/14* (2006.01)

(52) U.S. Cl.
CPC ......... *G02B 5/3041* (2013.01); *C09D 133/14* (2013.01); *G02F 1/133528* (2013.01); *Y10T 428/10* (2015.01); *Y10T 428/1036* (2015.01)

(58) Field of Classification Search
CPC ............ G02B 5/3041; G02F 1/133528; C09D 133/14; B32B 2457/202; Y10T 428/10; Y10T 428/1036
See application file for complete search history.

(56) References Cited

U.S. PATENT DOCUMENTS

| 7,550,556 | B1* | 6/2009 | Nakamura | ......... C08G 18/6254 528/44 |
| 2007/0146887 | A1* | 6/2007 | Ikeda | ...................... G02B 1/111 359/586 |

(Continued)

FOREIGN PATENT DOCUMENTS

| CN | 1755396 A | 4/2006 |
| CN | 101932960 A | 12/2010 |

(Continued)

OTHER PUBLICATIONS

Korean Office action dated Mar. 24, 2017, corresponding to Korean Patent Application No. 10-2014-0114587 (6 pages).

(Continued)

*Primary Examiner* — Anthony J Frost
(74) *Attorney, Agent, or Firm* — Lewis Roca Rothgerber Christie LLP (57) ABSTRACT

A composition for protective layers of a polarizing plate includes a photocurable monomer or oligomer having a glass transition temperature (Tg) of about 50° C. or greater, particles, a reactive monomer or oligomer, and an initiator. A polarizing plate includes a polarizer and a protective layer formed from the composition on one or both surfaces of the polarizer. The protective layer has a storage modulus at about 25° C. of greater than about 2000 MPa, as measured at a heating rate of 10° C./min, a temperature of −50° C. to 100° C., a frequency of 1 Hz, and a strain of 0.5%. An optical display includes the polarizing plate.

14 Claims, 2 Drawing Sheets

(56) References Cited

U.S. PATENT DOCUMENTS

| | | |
|---|---|---|
| 2009/0251642 A1 | 10/2009 | Nakamura et al. |
| 2014/0098331 A1* | 4/2014 | Hisanaga ............... G02B 1/105 |
| | | 349/96 |
| 2014/0116618 A1* | 5/2014 | Nakata .............. B29C 66/83415 |
| | | 156/308.2 |

FOREIGN PATENT DOCUMENTS

| | | |
|---|---|---|
| CN | 103226217 A | 7/2013 |
| JP | 2009-122796 A | 6/2009 |
| JP | 2009-244860 A | 10/2009 |
| KR | 10-2009-0039737 A | 4/2009 |
| KR | 10-2011-0014555 A | 2/2011 |
| TW | 201402753 A | 1/2014 |

OTHER PUBLICATIONS

Taiwanese Office action dated Apr. 12, 2017, corresponding to Taiwanese Patent Application No. 104128310 (17 pages).

Chinese Office action dated Feb. 8, 2017, corresponding to Chinese Patent Application No. 201510543547.0 (8 pages).

Korean Office action dated Sep. 8, 2016, corresponding to Korean Patent Application No. 10-2014-0114587 (9 pages).

\* cited by examiner

POLARIZING PLATE, COMPOSITION FOR PROTECTIVE LAYERS OF A POLARIZING PLATE, AND OPTICAL DISPLAY INCLUDING THE SAME

CROSS-REFERENCE TO RELATED APPLICATION

This application claims priority to and the benefit of Korean Patent Application No. 10-2014-0114587, filed on Aug. 29, 2014 in the Korean Intellectual Property Office, the entire content of which is incorporated herein by reference.

BACKGROUND

1. Technical Field

Embodiments of the present invention relate to a polarizing plate, a composition for protective layers of a polarizing plate, and an optical display including the same.

2. Description of the Related Art

Liquid crystal displays include polarizing plates on both surfaces of a glass substrate, thereby forming a surface of a liquid crystal which displays images on a screen. The polarizing plate includes a polarizer, which is typically manufactured by stretching a polyvinyl alcohol film, and forming a protective film (such as triacetyl cellulose (TAC)) on at least one surface of the polarizer. The protective film is bonded to the polarizer via an adhesive for a polarizing plate. Recently, in order to reduce the thickness of the polarizing plate, a polarizing plate is being developed that includes the protective film on only one surface of the polarizer.

The polarizing plate in which the protective film is formed on only one surface of the polarizer includes an adhesive layer for adhesion to the liquid crystal panel, which is formed on the other surface of the polarizer. However, since the polarizing plate includes the protective film on only one surface of the polarizer, the polarizing plate can suffer from deteriorations in mechanical strength and durability, as compared with polarizing plates in which the protective film is formed on both surfaces of the polarizer. In addition, since the polarizer is manufactured by stretching, the polarizer can suffer from cracking due to shrinkage in the machine direction (MD) (corresponding to a stretching direction thereof) under severe environmental conditions (such as storage or repetitive thermal shock at high temperature and/or high humidity). In particular, the polarizer can suffer from severe cracking along with increased size of the polarizing plate.

SUMMARY

Embodiments of the present invention provide a polarizing plate in which a protective film is formed on one or both surfaces of a polarizer. The polarizer suffers from no (or a reduced or minimized amount of) cracks even under thermal shock at high temperature and/or high humidity.

In accordance with embodiments of the present invention, a polarizing plate may include a polarizer and a protective layer formed on one or both surfaces of the polarizer. The protective layer may have a storage modulus at about 25° C. of greater than about 2000 MPa, as measured at a heating rate of 10° C./min, a temperature of −50° C. to 100° C., a frequency of 1 Hz, and a strain of 0.5%.

According to embodiments of the present invention, the polarizing plate may include the polarizer and the protective layer formed on one or both surfaces of the polarizer, and the protective layer may include particles.

In accordance with embodiments of the present invention, a composition for protective layers of a polarizing plate may include: (A) a monomer or oligomer having a glass transition temperature (Tg) of about 50° C. or greater; (B) particles; (C) a reactive monomer or oligomer; and (D) an initiator.

In accordance with embodiments of the present invention, an optical display may include the polarizing plate described herein.

In accordance with embodiments of the present invention, an optical display comprises a protective layer formed from the composition for protective layers of a polarizing plate described herein.

DETAILED DESCRIPTION

Embodiments of the present invention are described with reference to the accompanying drawings. It is understood that the present invention may be embodied in different ways and is not limited to the following embodiments. In the drawings, portions irrelevant to the description are omitted for clarity. Like components will be denoted by like reference numerals throughout the specification.

As used herein, the term "(meth)acrylate" refers to acrylates and methacrylates.

As used herein, the term "storage modulus" refers to the storage modulus of a specimen prepared by cutting a protective layer (which is formed by coating a composition for protective layers of a polarizing plate to a thickness of about 50 μm onto a release film (for example, a polyethylene terephthalate film), curing the composition at an irradiance of about 400 mW/cm² at a dose of about 1000 mJ/cm², followed by removing the release film). The specimen is prepared by cutting the protective layer to a size of about 10 mm×about 100 mm (width×length) and then securing the sample to a dynamic mechanical analyzer (DMA) (Q800, TA Instruments Inc.). Then, the storage modulus at about 25° C. is measured in a Tension Film analysis mode, at an amplitude of 25 μm, a pre load of 0.5 N, a heating rate of 10° C./min, a temperature of −50° C. to 100° C., a frequency of 1 Hz, and a strain of 0.5%.

Figure 1:
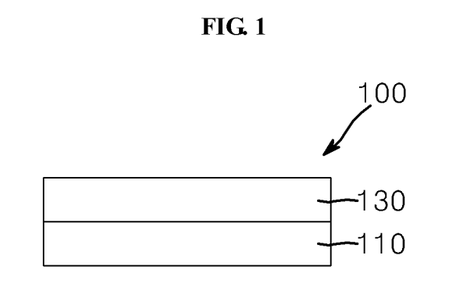
FIG. 1 is a schematic cross-sectional view of a polarizing plate according to embodiments of the present invention.

Hereinafter, a polarizing plate according to embodiments of the present invention is described with reference to FIG. 1. FIG. 1 is a schematic cross-sectional view of a polarizing plate according to embodiments of the present invention.

Figure 2:
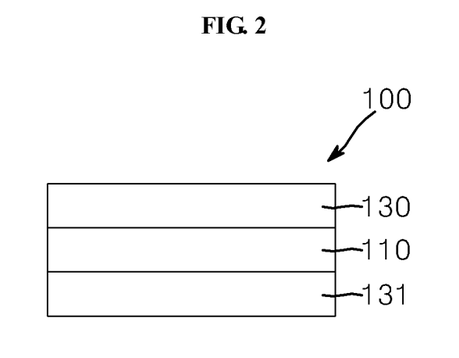
FIG. 2 is a schematic cross-sectional view of a polarizing plate according to embodiments of the present invention.

Referring to FIG. 1, a polarizing plate 100 according to embodiments of the invention may include a polarizer 110 and a protective layer 130 formed on one surface of the polarizer 110. The protective layer 130 may have a storage modulus of greater than about 2000 MPa. Referring to FIG. 2, a polarizing plate 100 according to embodiments of the invention may include a polarizer 110 and the same or different protective layers 130, 131 on both surfaces of the polarizer 110. The protective layer 130 may have a storage modulus of greater than about 2000 MPa.

Figure 3:
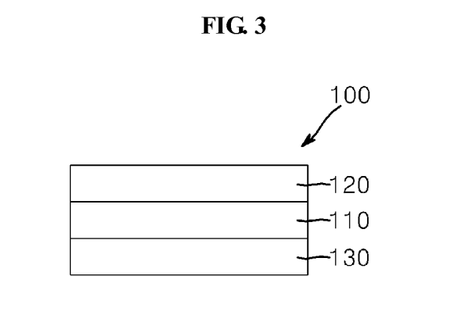
FIG. 3 is a schematic cross-sectional view of a polarizing plate according to embodiments of the present invention.

Referring to FIG. 3, a polarizing plate 100 according to embodiments includes an optical film 120 formed on one surface of a polarizer 110, and a protective layer 130 formed on the other surface of the polarizer 110 and having a storage modulus of greater than about 2000 MPa. The polarizer does not suffer from cracks (or suffers from a reduced amount of cracks) even under severe thermal shock conditions. For example, the protective layer may have a storage modulus of about 2050 MPa or greater, for example, about 2050 MPa to about 3900 MPa. Within these ranges, the polarizing plate does not suffer from cracks (or suffers from a reduced amount of cracks) and exhibits improved durability. As a result, the polarizing plate may have a maximum crack length of 1000 μm or less, for example, 490 μm or less, as measured at one end of the polarizer when the polarizing plate is subjected to high temperature and low temperature cycling. As used herein, the term "thermal shock" means that a specimen is subjected to about 250 cycles, each of which includes heating the specimen from −40° C. to 85° C., in which the specimen is allowed to stand at about −40° C. for about 30 minutes before heating, and is then allowed to stand at about 85° C. for 30 minutes after heating to about 85° C.

Components of the polarizing plate according to embodiments of the present invention are described below.

The polarizer 110 allows the screen in a display to be visible by polarizing natural light or artificial light, and may be manufactured from a polyvinyl alcohol (PVA) film. For example, the polarizer 110 may be manufactured by dyeing a modified polyvinyl alcohol film (such as a partially formalized polyvinyl alcohol film, an acetoacetyl group-modified polyvinyl alcohol film, or the like) with iodine or a dichroic dye, followed by stretching in the MD. For example, the polarizer is manufactured by swelling, dyeing and stretching. A method for performing each of these processes is generally known to those skilled in the art.

Alternatively, an acid catalyst-impregnated film may be prepared using a coating solution containing an acid catalyst and polyvinyl alcohol (PVA), followed by separately dry stretching and dehydrating to form a dehydrated film. Next, the dehydrated film is hydrated, followed by wet stretching and neutralization of the hydrated film, thereby manufacturing the polarizer.

The polarizer 110 may have a thickness of about 3 μm to about 50 μm, for example, about 5 μm to about 15 μm. Within these ranges, the polarizer can be used for optical displays.

The protective layer 130 is formed on one or both surfaces of the polarizer to protect the polarizer and to prevent (or reduce) thermal shock and moisture permeation. Thus, the protective layer 130 can prevent the polarizer from cracking (or reduce the occurrence of cracking).

In addition, an optical layer may additionally be applied to the polarizing plate in some embodiments of the present invention. For example, the optical layer may include a brightness improving film, a reflective film, a retardation film, and/or the like.

Since the protective layer 130 has a thickness in a specified range, the protective layer 130 can reinforce the polarizing plate, which can otherwise exhibit low mechanical strength due to the formation of an optical film on only one surface of the polarizing plate. Additionally, the protective layer having a thickness within a specified range can enable a thickness reduction in the polarizing plate. For example, the protective layer 130 may have a thickness of about 1 μm to about 30 μm, for example, about 2 μm to about 25 μm. Within these ranges, the protective layer 130 can be used in the polarizing plate, and can reinforce the mechanical strength of the polarizing plate. In embodiments of the present invention, the protective layer 130 may have a thickness of about 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm. In addition, the protective layer 130 may have a thickness ranging from any one of these numerical values to any other of these numerical values.

Even though the protective layer 130 includes particles, and thus ensures a storage modulus of greater than about 2000 MPa as described below, the protective layer 130 may be used in the polarizing plate due to its optical transparency. For example, the protective layer may have a haze of about 0.001% to about 5% and a transmittance of about 95% to about 100% at a wavelength of about 300 nm to about 700 nm. Within these ranges, the protective layer is transparent and thus can be used in the polarizing plate.

The protective layer 130 includes particles (not shown in FIG. 1). As a result, the protective layer can exhibit a storage modulus of greater than about 2000 MPa. Although the protective layer can be formed by curing a photocurable monomer or oligomer having a high glass transition temperature (Tg) or by curing a highly functional photocurable monomer or oligomer to increase the glass transition temperature or the degree of crosslinking thereof (and thus can have an increased storage modulus), the protective layer formed in this manner does not achieve a storage modulus of greater than about 2000 MPa. However, according to embodiments of the present invention, the protective layer may be formed from the photocurable monomer or oligomer and the particles, thereby achieving a storage modulus of greater than about 2000 MPa, for example, about 2050 MPa to about 3900 MPa.

In embodiments of the present invention, the protective layer may have a storage modulus of about 2050 MPa, 2100 MPa, 2150 MPa, 2200 MPa, 2250 MPa, 2300 MPa, 2350 MPa, 2400 MPa, 2450 MPa, 2500 MPa, 2550 MPa, 2600 MPa, 2650 MPa, 2700 MPa, 2750 MPa, 2800 MPa, 2850 MPa, 2900 MPa, 2950 MPa, 3000 MPa, 3050 MPa, 3100 MPa, 3150 MPa, 3200 MPa, 3250 MPa, 3300 MPa, 3350 MPa, 3400 MPa, 3450 MPa, 3500 MPa, 3550 MPa, 3600 MPa, 3650 MPa, 3700 MPa, 3750 MPa, 3800 MPa, 3850 MPa, or 3900 MPa. In addition, the protective layer may have a storage modulus ranging from any one of these numerical values to any other of these numerical values.

In some embodiments, the particles are spherical nanoparticles and may have an average particle diameter (D50) of about 1 nm to about 100 nm, for example about 3 nm to about 50 nm. Within these ranges, the protective layer does not suffer from increases in haze (or suffers from a reduced amount of haze). Further, the protective film is transparent and can be used as a protective layer for polarizing plates. The D50 may be measured by any suitable measurement method known to those skilled in the art.

The particles may include organic particles, inorganic particles, or a mixture thereof. The organic particles may include at least one of non-core-shell type monomolecular particles, and/or core-shell type particles. For example, the organic particles may include at least one of (meth)acrylic, siloxane, melamine, polycarbonate and/or styrene particles, but is not limited thereto. The inorganic particles may be non-core-shell type monomolecular particles, and may include at least one of silica ($SiO_2$), aluminum oxide ($Al_2O_3$), zirconium oxide ($ZrO_2$), calcium carbonate, barium sulfate, titanium dioxide, aluminum hydroxide, talc, magnesium oxide, and/or zinc oxide, but the inorganic particles are not limited thereto. For example, the particles may be inorganic particles, thereby improving the storage modulus of the protective layer despite only a small amount thereof.

The particles may be present in an amount of about 5% by weight (wt %) to about 40 wt %, for example, about 6 wt % to about 35 wt %, in the protective layer 130. Within these ranges, the protective layer has a storage modulus of greater than about 2000 MPa, and thus can suppress (or reduce the occurrence of) crack generation. Additionally, the composition for protective layers of a polarizing plate can exhibit good coatability since the viscosity of the composition is not increased. In addition, since the protective layer can prevent moisture permeation even under moisture resistance testing conditions (e.g., about 85° C./about 85% RH, about 72 hours), the protective layer can prevent (or reduce the occurrence of) delamination and cracking.

The protective layer 130 may be formed by curing the composition for protective layers of a polarizing plate, which includes the photocurable monomer or oligomer and the particles. The particles may be organic material-coated particles rather than non-coated particles. As a result, the photocurable monomer or oligomer and the particles are mixed well without separating from each other upon curing of the composition including the photocurable monomer or oligomer and the particles, and the particles are dispersed well in the protective layer. Thus, the protective layer can does not become opaque or suffer non-uniformity of the storage modulus.

The particles may include organic silane compound-coated particles, and/or may be a commercially available product.

The protective layer 130 may be formed by coating the composition for protective layers of a polarizing plate onto one surface of the polarizer, followed by curing at an irradiance of about 100 mW/cm$^2$ to about 1000 mW/cm$^2$, and at a dose of about 100 mJ/cm$^2$ to about 1500 mJ/cm$^2$.

Referring to FIG. 3, the polarizing plate 100 according to embodiments of the invention may include the polarizer 110, the optical film 120 on one surface of the polarizer 110, and the protective layer 130 on the other surface of the polarizer 110. The polarizing plate 100 depicted in FIG. 3 is substantially the same as the polarizing plate described above in connection with FIG. 1 except for the inclusion of the optical film 120.

The optical film 120 may be formed on one surface of the polarizer to protect the polarizer 110, and may include any suitable optically transparent film. For example, the optical film 120 may be formed of at least one of a cyclic polyolefin (including amorphous cyclic olefin polymers (COP) and the like), a polyester (including poly(meth)acrylate, polycarbonate, polyethylene terephthalate (PET) and the like), a cellulose ester (including triacetyl cellulose and the like), a polyethersulfone, a polysulfone, a polyamide, a polyimide, a polyolefin, a polyarylate, a polyvinyl alcohol, a polyvinyl chloride, and/or a polyvinylidene chloride.

The optical film 120 may have a thickness of about 10 μm to about 200 μm, for example, about 30 μm to about 120 μm. Within these ranges, the optical film can be used in optical displays.

Although not shown in FIG. 3, the polarizing plate 100 may further include a functional coating layer on an upper surface of the optical film 120 to provide additional function to the film. For example, the functional coating layer may include a hard coating layer, an anti-fingerprinting layer, an anti-reflective layer, and/or the like.

The protective layer 130 has a specified thickness ratio with respect to the optical film 120, and thus also serves as an optical film on the other surface of the polarizer, thereby improving the mechanical strength of the polarizing plate. For example, a ratio (D2/D1) of the thickness D2 of the protective layer to the thickness D1 of the optical film ranges from about 2:3 to about 1:10, for example, from about 2:3 to about 1:5, or from about 2:3 to about 1:2. Within these ranges, the protective layer can be used in the polarizing plate and can reinforce the mechanical strength of the polarizing plate.

Hereinafter, the composition for protective layers of a polarizing plate according to embodiments of the present invention is described.

According to embodiments of the invention, the composition for protective layers of a polarizing plate may include: (A) a photocurable monomer or oligomer having a glass transition temperature (Tg) of about 50° C. or greater; (B) particles; (C) a reactive monomer or oligomer; and (D) an initiator. As a result, a protective layer having a storage modulus of greater than about 2000 MPa may be formed by curing the composition.

The (A) photocurable monomer or oligomer having a glass transition temperature of about 50° C. or greater forms a protective layer matrix upon curing, supports the particles in the protective layer, and improves the storage modulus of the protective layer. The (A) photocurable monomer or oligomer having a glass transition temperature of about 50° C. or greater may be a photocurable monomer or oligomer having a photocurable functional group, for example, at least one of a (meth)acrylate group and/or an epoxy group.

The (A) photocurable monomer or oligomer having a glass transition temperature of about 50° C. or greater improves the storage modulus of the protective layer in conjunction with the particles and the reactive monomer or oligomer when cured, and provides adhesion to the polarizer. For example, the (A) photocurable monomer or oligomer may have a glass transition temperature of about 50° C. or greater, for example, about 70° C. to about 100° C. Within these ranges, the protective layer can have a storage modulus of greater than about 2000 MPa, and exhibit excellent durability. In some embodiments, in order to improve the storage modulus of the polarizer, the photocurable monomer or oligomer having a glass transition temperature of about 50° C. or greater may be a bifunctional monomer or oligomer, and may be a monomer or oligomer having (or not having) a hydroxyl group, for example a non-hydroxyl group monomer or oligomer that does not have a hydroxyl group.

The (A) photocurable monomer or oligomer having a glass transition temperature of about 50° C. or greater may be any photocurable monomer or oligomer so long as the photocurable monomer or oligomer has a glass transition temperature of about 50° C. or greater. For example, the photocurable monomer or oligomer having a glass transition temperature of about 50° C. or greater may include at least one of tripropylene glycol di(meth)acrylate, tris(2-hydroxyethyl)isocyanurate di(meth)acrylate, dipropylene glycol di(meth)acrylate, bisphenol A di(meth)acrylate, hydroxypivalic acid neopentyl glycol di(meth)acrylate, polypropylene glycol di(meth)acrylate, tetraethylene glycol di(meth)acrylate, and/or tricyclodecane dimethanol di(meth)acrylate, but the photocurable monomer or oligomer is not limited thereto.

The (A) photocurable monomer or oligomer having a glass transition temperature of about 50° C. or greater may be present in an amount of about 20 parts by weight to about 80 parts by weight, for example, about 25 parts by weight to about 75 parts by weight based on 100 parts by weight of A+B+C (i.e., the (A) photocurable monomer or oligomer having a glass transition temperature of about 50° C. or greater, the (B) particles, and the (C) reactive monomer or oligomer). Within these ranges, the protective layer can have a storage modulus of greater than about 2000 MPa, and the composition can exhibit good coatability and adhesion to the polarizer. In addition, the protective layer including the photocurable monomer or oligomer in an amount within these ranges can exhibit a thermal shock prevention effect, since the protective layer can protect the polarizer from thermal shock when the protective layer has a higher glass transition temperature (Tg) than the polarizer.

The (B) particles may be present in an amount of about 5 parts by weight to about 40 parts by weight, for example, about 5 parts by weight to about 35 parts by weight based on 100 parts by weight of A+B+C (i.e., the (A) photocurable monomer or oligomer having a glass transition temperature of about 50° C. or greater, the (B) particles, and the (C) reactive monomer or oligomer). Within these ranges, the protective layer can have a storage modulus of greater than about 2000 MPa, and the composition can exhibit good adhesion to the polarizer.

The (C) reactive monomer or oligomer forms the protective layer upon curing, and improves the dispersibility of the particles. The (C) reactive monomer may include at least one of (C1) an acrylic monomer or oligomer having at least one hydrophilic group and/or (C2) an acrylic monomer or oligomer having at least two (meth)acryloyl groups.

The (C1) acrylic monomer or oligomer having at least one hydrophilic group has a hydrophilic group and thus can further improve adhesion to the protective layer. The hydrophilic group-containing monomer may be a monofunctional monomer having a glass transition temperature of about −70° C. to about 100° C. The hydrophilic group may be a hydroxyl group and/or a carboxyl group, for example, a hydroxyl group, but is not limited thereto. For example, (C1) an acrylic monomer or oligomer having at least one hydrophilic group may be photocurable.

The (C1) acrylic monomer or oligomer having at least one hydrophilic group may be a monofunctional (meth)acrylate having at least one hydroxyl group-containing $C_1$ to $C_{20}$ alkyl group, at least one hydroxyl group-containing $C_3$ to $C_{20}$ alicyclic group, or at least one hydroxyl group-containing $C_6$ to $C_{20}$ aryl group. For example, the (C1) acrylic monomer or oligomer having at least one hydrophilic group may include at least one of 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, 2-hydroxy-3-phenyloxypropyl (meth)acrylate, 4-hydroxycyclopentyl (meth)acrylate, 2-hydroxy-3-phenyloxybutyl (meth)acrylate, or 4-hydroxycyclohexyl (meth)acrylate, but the (C1) acrylic monomer or oligomer is not limited thereto.

In addition, the (C1) acrylic monomer or oligomer having at least one hydrophilic group may be a monofunctional (meth)acrylate having at least one carboxyl group-containing $C_1$ to $C_{20}$ alkyl group, at least one carboxyl group-containing $C_3$ to $C_{20}$ alicyclic group, or at least one carboxyl group-containing $C_6$ to $C_{20}$ aryl group. For example, the (C1) acrylic monomer or oligomer having at least one hydrophilic group may include at least one of acrylic acid, methacrylic acid, 2-(acryloyloxy)ethanoic acid, 3-(acryloyloxy)propanoic acid, 4-(acryloyloxy)butanoic acid, 5-(acryloyloxy)pentanoic acid, 6-(acryloyloxy)hexanoic acid, itaconic acid, and/or maleic acid, but the (C1) acrylic monomer or oligomer is not limited thereto.

Since the (C2) acrylic monomer or oligomer having at least two (meth)acryloyl groups has at least two acryloyl groups, a composition including this monomer can form a protective layer having a storage modulus of greater than about 2000 MPa when cured. In addition, the protective layer can achieve a storage modulus of greater than about 2000 MPa despite including a small amount of the particles, and thus the protective layer does not exhibit increased haze. The monomer or oligomer having at least two (meth)acryloyl groups may have a glass transition temperature of about −40° C. to about 150° C.

In some embodiments, the (C2) acrylic monomer or oligomer having at least two (meth)acryloyl groups may be any monomer or oligomer so long as the monomer or oligomer has at least two (meth)acryloyl groups. For example, the (C2) acrylic monomer or oligomer having at least two (meth)acryloyl groups may include at least one of ethylene glycol di(meth)acrylate, triethylene glycol di(meth)acrylate, 1,4-butanediol di(meth)acrylate, 1,6-hexanediol di(meth)acrylate, octyldiol di(meth)acrylate, nonyldiol di(meth)acrylate, decanediol di(meth)acrylate, undecanediol di(meth)acrylate, dodecyldiol di(meth)acrylate, neopentyl glycol di(meth)acrylate, pentaerythritol di(meth)acrylate, dipentaerythritol di(meth)acrylate, bisphenol A di(meth)acrylate, diethylene glycol di(meth)acrylate, tri(propylene glycol) di(meth)acrylate, and/or poly(propylene glycol) di(meth)acrylate, but the (C2) acrylic monomer or oligomer is not limited thereto.

In some embodiments, the (C2) acrylic monomer or oligomer having at least two (meth)acryloyl groups may be an acrylic monomer or oligomer having at least three (meth)acryloyl groups. When an acrylic monomer or oligomer having at least three (meth)acryloyl groups is used, the protective layer can exhibit increased storage modulus due to an increased degree of crosslinking of the composition upon curing, and can exhibit improved reliability due to improved cohesion.

The acrylic monomer or oligomer having at least three (meth)acryloyl groups may be, for example, a trifunctional to hexafunctional acrylic monomer or oligomer, and may further include at least one photocurable functional group, for example, an epoxy group.

For example, the acrylic monomer or oligomer having at least three (meth)acryloyl groups may include: a trifunctional monomer (such as pentaerythritol tri(meth)acrylate, trimethylolpropane tri(meth)acrylate, glycerin-propoxylated tri(meth)acrylate, tris(2-hydroxyethyl)isocyanurate tri(meth)acrylate, and the like); a tetrafunctional monomer or oligomer (such as pentaerythritol tetra(meth)acrylate, dimethylolpropane tetra(meth)acrylate, tetrafunctional polyester (meth)acrylate (Product Name: PS-4610, PS-460, PS-420), and the like); a pentafunctional monomer (such as dipentaerythritol penta(meth)acrylate, and the like); and/or a hexafunctional monomer or oligomer (such as hexafunctional polyester (meth)acrylate (Product Name: PS-610), and the like), but the acrylic monomer or oligomer having at least three (meth)acryloyl groups is not limited thereto.

When the acrylic monomer or oligomer having at least three (meth)acryloyl groups is used, the protective layer can exhibit good reliability due to high cohesion, and the composition does not exhibit (or exhibits a reduced or minimized amount of) deteriorated adhesion to the polarizer due to low cure shrinkage.

Since both the (A) photocurable monomer or oligomer having a glass transition temperature of about 50° C. or greater and the (C2) acrylic monomer or oligomer having at least two (meth)acryloyl groups increase the storage modulus of the protective layer in conjunction with the particles, the content ratio therebetween may be controlled to achieve a storage modulus of the protective layer of greater than about 2000 MPa while also ensuring suitable adhesion of the protective layer without increasing the haze of the protective layer. For example, a weight ratio (A:C2) of the (A) photocurable monomer or oligomer having a glass transition temperature of about 50° C. or greater to the (C2) acrylic monomer or oligomer having at least two (meth)acryloyl groups in the composition for protective layers of a polarizing plate may range from about 5:1 to about 15:1, for example from about 6:1 to about 14:1. Within these ranges, the composition can exhibit improved crosslinking density. In some embodiments, the weight ratio (A:C2) of the (A) photocurable monomer or oligomer having a glass transition temperature of about 50° C. or greater to the (C2) acrylic monomer or oligomer having at least two (meth)acryloyl groups in the composition for protective layers of a polarizing plate may be about 5:1, 6:1, 7:1, 8:1, 9:1, 10:1, 11:1, 12:1, 13:1, 14:1, or 15:1. In addition, the weight ratio (A:C2) of the (A) photocurable monomer or oligomer having a glass transition temperature of about 50° C. or greater to the (C2) acrylic monomer or oligomer having at least two (meth) acryloyl groups in the composition for protective layers of a polarizing plate may range from any one of these numerical values to any other of these numerical values.

Further, a weight ratio (A:B:C2) of the (A) photocurable monomer or oligomer having a glass transition temperature of about 50° C. or greater to the (B) particles to the (C2) acrylic monomer or oligomer having at least two (meth) acryloyl groups in the composition for protective layers of a polarizing plate may range from about 5:2:1 to about 15:4:1. Within this range, the protective layer can exhibit an improved modulus (e.g., about 2000 MPa or greater).

The (C) reactive monomer or oligomer may be present in an amount of about 5 parts by weight to about 60 parts by weight, for example, about 10 parts by weight to about 60 parts by weight based on 100 parts by weight of A+B+C (i.e., the (A) photocurable monomer or oligomer having a glass transition temperature of about 50° C. or greater, the (B) particles, and the (C) reactive monomer or oligomer). Within these ranges, the composition can exhibit good adhesion to the polarizer, and the polarizing plate can exhibit good cuttability.

Although the (C) reactive monomer or oligomer may be included alone in the composition, the (C) reactive monomer or oligomer may also be included in a mixture of a monomer and particles. The mixture of the monomer and the particles may be a solvent-free mixture and can improve the processability of the composition due to elimination of a drying step for removal of a solvent when coated onto the polarizer. The mixture of a monomer and particles may be a commercially available product.

The (D) initiator allows the protective layer to be formed by promoting the curing of the (A) photocurable monomer or oligomer having a glass transition temperature of about 50° C. or greater and the (C) reactive monomer or oligomer, and may include at least one of a photocationic polymerization initiator and/or a photosensitizer.

The photocationic polymerization initiator promotes curing by generating cations through light irradiation, and may include any suitable photocationic polymerization initiators capable of performing the photocuring reaction. The photocationic polymerization initiator may include an onium salt including an onium cation and an anion. Examples of the onium cation may include: diaryliodoniums (such as diphenyliodonium, 4-methoxydiphenyliodonium, bis(4-methylphenyl)iodonium, (4-methylphenyl)[(4-(2-methylpropyl)phenyl], bis(4-tert-butylphenyl)iodonium, bis(dodecylphenyl)iodonium, and the like), triarylsulfoniums (such as triphenylsulfonium, diphenyl-4-thiophenoxyphenylsulfonium, and the like), bis[4-(diphenylsulfonio)-phenyl]sulfide, bis[4-(di(4-(2-hydroxyethyl)phenyl)sulfonio)-phenyl]sulfide, 5-2,4-(cyclopentadienyl)[1,2,3,4,5,6-η]-(methylethyl)-benzene]-iron(1+), and the like. Examples of the anion may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and the like.

The photosensitizer catalyzes the curing reaction by generating a small amount of radicals through light irradiation. The photosensitizer may include phosphorus, triazine, acetophenone, benzophenone, thioxanthone, benzoin, oxime photosensitizers, and/or a mixture thereof. In some embodiments, the photosensitizer may be a thioxanthone photosensitizer, thereby further improving reactivity.

The initiator may be present in an amount of about 0.1 parts by weight to about 10 parts by weight, for example, about 1 part by weight to about 5 parts by weight in terms of solids content, based on 100 parts by weight of (A), (B) and (C). Within these ranges, the composition can be sufficiently cured, and a protective layer using the composition does not suffer from (or suffers a reduced amount of) deterioration in transmittance due to residual initiator.

The composition for protective layers of a polarizing plate may be prepared by mixing the photocurable monomer and the particles, followed by introduction of the initiator, and then mixing. The composition for protective layers of a polarizing plate may have a viscosity at about 25° C. of about 20 mPa·s to about 120 mPa·s. Within this range, the composition can exhibit good coatability.

Referring to FIG. 1 again, the polarizing plate 100 may have a thickness of about 60 μm to about 150 μm, for example, about 50 μm to about 150 μm. Within these ranges, the polarizing plate can be used in optical displays and can achieve a reduction in thickness. In some embodiments, the polarizing plate 100 may have a thickness of about 60 μm, 61 μm, 62 μm, 63 μm, 64 μm, 65 μm, 66 μm, 67 μm, 68 μm, 69 μm, 70 μm, 71 μm, 72 μm, 73 μm, 74 μm, 75 μm, 76 μm, 77 μm, 78 μm, 79 μm, 80 μm, 81 μm, 82 μm, 83 μm, 84 μm, 85 μm, 86 μm, 87 μm, 88 μm, 89 μm, 90 μm, 91 μm, 92 μm, 93 μm, 94 μm, 95 μm, 96 μm, 97 μm, 98 μm, 99 μm, 100 μm, 101 μm, 102 μm, 103 μm, 104 μm, 105 μm, 106 μm, 107 μm, 108 μm, 109 μm, 110 μm, 111 μm, 112 μm, 113 μm, 114 μm, 115 μm, 116 μm, 117 μm, 118 μm, 119 μm, 120 μm, 121 μm, 122 μm, 123 μm, 124 μm, 125 μm, 126 μm, 127 μm, 128 μm, 129 μm, 130 μm, 131 μm, 132 μm, 133 μm, 134 μm, 135 μm, 136 μm, 137 μm, 138 μm, 139 μm, 140 μm, 141 μm, 142 μm, 143 μm, 144 μm, 145 μm, 146 μm, 147 μm, 148 μm, 149 μm, or 150 μm. In addition, the polarizing plate 100 may have a thickness ranging from any one of these numerical values to any other of these numerical values.

Hereinafter, an optical display according to embodiments of the present invention is described.

The optical display according to the present invention may include the polarizing plate according to the present invention. The optical display is a typical optical display including a polarizing plate, and may include, for example, a liquid crystal display, and the like.

Figure 4:
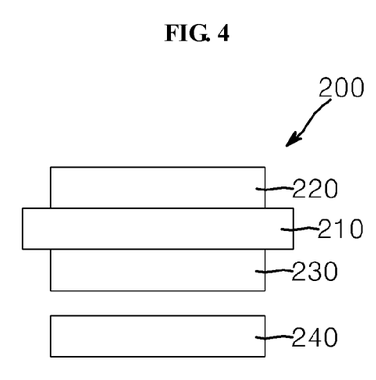
FIG. 4 is a schematic cross-sectional view of an optical display according to embodiments of the present invention.

Hereinafter, an optical display according to one embodiment will be described in detail with reference to FIG. 4. FIG. 4 is a sectional view of an optical display according to one embodiment of the present invention.

Referring to FIG. 4, an optical display 200 according to embodiments of the invention may include: a liquid crystal display panel 210; a first polarizing plate 220 formed on one surface of the liquid crystal display panel 210; and a second polarizing plate 230 formed on the other surface of the liquid crystal display panel 210 and between the liquid crystal display panel 210 and a light source unit 240. At least one of the first and second polarizing plates 220, 230 may include the polarizing plate described herein according to embodiments of the present invention.

In some embodiments, the optical display may comprise a protective layer formed from the composition for protective layers of a polarizing plate. For an example, the optical display may comprise a polarizing plate, and the polarizing plate may comprise a protective layer formed from the composition for protective layers of a polarizing plate according to embodiments of the present invention on a surface of the polarizer.

Embodiments of the present invention are described below with reference to some examples. However, it is understood that these examples are provided for illustration only and are not to be construed in any way as limiting the present invention.

EXAMPLES

The components used in the Examples and Comparative Examples are as follows.

A. Photocurable monomer or oligomer having a glass transition temperature of 50° C. or greater (A1) Tris(2-hydroxyethyl)isocyanurate diacrylate (THE-ICDA, M-2370, Miwon Commercial Co., Ltd., Tg: 131° C.)

(A2) Tripropylene glycol diacrylate (TPGDA, M-220, Miwon Commercial Co., Ltd., Tg: 62° C.)

B. Particles (B1) $SiO_2$: 10 nm to 30 nm silica (Guangzhou Co., Ltd.)

(B2) 5 nm to 10 nm-size 50% $Al_2O_3$ (Yurui (Shanghai) Chemical Co., Ltd.)

C. Reactive monomer or oligomer (C1) Hydroxyl group-containing photocurable monomer: 2-hydroxyethyl acrylate (C2-1) Pentaerythritol tetraacrylate (PETA, M-340, Miwon Commercial Co., Ltd.)

(C2-2) Hexafunctional polyester acrylate (PS-610, Miwon Commercial Co., Ltd.)

D. Photoinitiator: 2,4,6-trimethylbenzoyl-diphenyl-phosphine oxide (Darocure TPO, Ciba Co., Ltd.)

F. Photocurable monomer or oligomer having glass transition temperature of 32° C.: Neopentyl glycol diacrylate (M-216, Miwon Commercial Co., Ltd.)

Examples 1 to 8 and Comparative Examples 1 to 5

The components A, B, C and F were mixed in the amounts listed in Table 1 (unit: parts by weight) without a solvent. 2 parts by weight of the component D was added to each mixture, thereby preparing a composition for a polarizing plate protective layer.

TABLE 1

| | A | | B | | C | | | F |
|---|---|---|---|---|---|---|---|---|
| | A1 | A2 | B1 | B2 | C1 | C2-1 | C2-2 | F |
| Example 1 | 30 | — | 30 | — | 35 | 5 | — | — |
| Example 2 | 30 | — | — | 30 | 35 | 5 | — | — |
| Example 3 | 30 | — | 35 | — | 35 | — | — | — |
| Example 4 | 50 | — | 20 | — | 25 | 5 | — | — |
| Example 5 | 50 | — | — | 20 | 25 | — | 5 | — |
| Example 6 | 50 | — | — | 20 | 25 | — | 5 | — |
| Example 7 | 70 | — | 15 | — | 10 | 5 | — | — |
| Example 8 | 70 | — | — | 15 | 10 | — | 5 | — |
| Example 9 | — | 30 | 30 | — | 35 | 5 | — | — |
| Example 10 | — | 70 | 15 | — | 10 | 5 | — | — |
| Comparative Example 1 | 30 | — | — | — | 70 | — | — | — |
| Comparative Example 2 | 50 | — | — | — | 45 | 5 | — | — |
| Comparative Example 3 | 100 | — | — | — | — | — | — | — |
| Comparative Example 4 | — | — | — | — | — | 100 | — | — |
| Comparative Example 5 | — | — | 35 | — | 35 | — | — | 30 |

Manufacture of Polarizing Plate

An 80 μm thick polyvinyl alcohol film (degree of saponification: 99.5, degree of polymerization: 2000) was dyed by dipping the film into a 0.3% aqueous iodine solution, followed by MD stretching to a stretching ratio of 5.0 times. Next, the stretched polyvinyl alcohol film was subjected to color compensation by dipping the stretched film into a 3% boric acid solution and into a 2% aqueous potassium iodide solution, followed by drying at 50° C. for 4 minutes, thereby manufacturing a polarizer (thickness: 25 μm). An 80 μm thick triacetyl cellulose (TAC) film was subjected to saponification and used as an optical film.

An adhesive was coated onto one surface of the polarizer at 22° C. to 25° C. and at 20% RH to 60% RH, followed by stacking an optical film thereon. Here, the adhesive was a water-based polyvinyl alcohol adhesive (i.e., a mixture of 100 parts by weight of water, 5 parts by weight of polyvinyl alcohol, 0.5 parts by weight of polyethylene imine, and 0.5 parts by weight of zirconium oxide). The composition for protective layers of a polarizing plate prepared in each of the Examples and Comparative Examples was coated onto the other surface of the polarizer, followed by UV irradiation at 400 mW/cm² and at 1000 mJ/cm² using a metal halide lamp. An adhesive (CI-205, Soken Co., Ltd.) was coated again onto the protective layer, thereby manufacturing a polarizing plate.

The composition for protective layers of a polarizing plate prepared according to the Examples and Comparative Examples and the polarizing plates manufactured using the compositions were evaluated as to the properties listed in Table 2.

TABLE 2

| | Adhesion to polarizer | Cuttability | Storage modulus of protective layer (25° C., MPa) | Crack on front surface of polarizer | Maximum length of crack generated at end of polarizer (μm) | Haze (%) |
|---|---|---|---|---|---|---|
| Example 1 | ◉ | ○ | 2200 | × | 300 | 1.8 |
| Example 2 | ◉ | ○ | 2150 | × | 250 | 1.5 |
| Example 3 | ◉ | ○ | 2300 | × | 300 | 1.6 |
| Example 4 | ◉ | ○ | 2300 | × | No crack | 1.8 |
| Example 5 | ◉ | ◉ | 2400 | × | No crack | 1.9 |
| Example 6 | ◉ | ◉ | 2450 | × | 150 | 1.5 |
| Example 7 | ○ | ◉ | 2100 | × | 400 | 1.5 |
| Example 8 | ○ | ◉ | 2200 | × | 200 | 1.7 |
| Example 9 | ◉ | ○ | 2050 | × | 490 | 1.6 |
| Example 10 | ○ | ○ | 2200 | × | 400 | 1.7 |
| Comparative Example 1 | ◉ | × | 1350 | ○ | 50000 | 1.7 |
| Comparative Example 2 | ◉ | ◉ | 1500 | ○ | 50000 | 1.8 |
| Comparative Example 3 | × | × | 900 | ○ | 50000 | 1.6 |
| Comparative Example 4 | × | × | 1600 | ○ | 50000 | 1.9 |
| Comparative Example 5 | ◉ | ◉ | 1700 | × | 46000 | 2.1 |

As shown in Table 2, the polarizing plates according to embodiments of the present invention did not suffer from cracks on the front surface of the polarizer when allowed to stand under thermal shock conditions, and suffered from an insignificant amount of cracks at one end of the polarizer. In addition, since the composition for protective layers of a polarizing plate according to embodiments of the present invention exhibited good adhesion to the polarizer and good cuttability, there was no need for additional formation of an adhesive layer between the polarizer and the polarizer protective layer.

On the other hand, the compositions prepared according to Comparative Examples 1 to 2 (which did not include the particles) caused cracks on the polarizing plate, despite exhibiting good adhesion.

The compositions prepared in Comparative Examples 3 to 4 (which did not include the particles and only included the monomer having a glass transition temperature of 50° C. or greater and the highly functional monomer) exhibited cracking due to deteriorations in adhesion to the polarizer, cuttability and storage modulus.

The composition prepared according to Comparative Example 5 (which included the monomer having a glass transition temperature of less than 50° C. despite including the particles) exhibited cracking due to a deteriorated modulus.

The composition prepared in Comparative Example 6 (which did not include the hydroxyl group-containing monomer despite including the particles) exhibited deteriorated adhesion to the polarizer.

Property Evaluation

1) Adhesion to the polarizer: To check adhesion of the polarizing plate, a cutter was inserted at one end thereof between the protective layer and the polarizer. A polarizing plate that did not permit the end of the cutter to be inserted between the protective layer and the polarizer was rated as ◉. A polarizing plate that permitted on a slight insertion of the end of the cutter between the protective layer and the polarizer was rated as ○. A polarizing plate that exhibited tearing (due to a certain strength) during insertion of the cutter (even though the end of the cutter was only slightly inserted between the protective layer and the polarizer) was rated as Δ. A polarizing plate that permitted easy insertion of the end of the cutter between the protective layer and the polarizer was rated as X.

2) Cuttability: To check cuttability of the polarizing plate, the polarizing plate was cut to a size of 500 mm×500 mm (width×length), followed by punching from a protective film side using the blade of a cutter. Peeling of the four edges of the punched polarizing plate was observed with the naked eye. A polarizing plate that suffered from no visible peeling was rated as ◉. A polarizing plate that suffered from peeling of greater than 0 mm but 1 mm or less was rated as ○. A polarizing plate that suffered from peeling of greater than 1 mm but 2 mm or less was rated as Δ. A polarizing plate that suffered from peeling of greater than 2 mm was rated as X.

3) Storage modulus of the protective layer: The composition for protective layers of a polarizing plate was coated to a thickness of 50 μm onto a polyethylene terephthalate release film, followed by curing at an irradiance of 400 mW/cm² at a dose of 1,000 mJ/cm². Next, the release film was removed, thereby manufacturing an adhesive film. The adhesive film was cut to a size of 10 mm×100 mm (width× length), thereby preparing a specimen. Next, with the specimen secured to a DMA (Q800, TA instruments Inc.), the storage modulus at 25° C. was measured in a Tension Film analysis mode at an amplitude of 25 μm, a pre load of 0.5 N, a heating rate of 10° C./min, a temperature range of from −50° C. to 100° C., a frequency of 1 Hz, and a strain of 0.5%.

4) Cracks on the front surface of the polarizer and the Maximum crack length at the end of the polarizer: To check the level of cracks in the polarizing plate under thermal shock conditions, the polarizing plate was cut to a size of 50 mm×50 mm (width×length), followed by lamination onto a glass sheet, thereby preparing a specimen. The specimen was subjected to 100 cycles, each of which included heating the specimen from −40° C. to 85° C., where the specimen was allowed to stand at about −40° C. for about 30 minutes before heating, and then allowing the specimen to stand at about 85° C. for 30 minutes after heating to about 85° C. Cracks in the polarizer generated in the MD were observed in a reflective mode and a backlight mode under a fluorescent lamp to measure the number of cracks and a maximum length thereof. A polarizing plate suffering from no cracking on the front surface of the polarizer was rated as X, and a polarizing plate suffering from one or more cracks on the front surface of the polarizer was rated as ◯.

5) Haze: A haze meter (model: NDH 5000, Nippon Denshoku Co., Ltd.) was used. The haze of the protective layer (thickness: 30 μm) at a wavelength of about 300 nm to about 700 nm was measured in accordance with D1003-95 (Standard Test for Haze and Luminous Transmittance of Transparent Plastic) of the American Society for Testing and Measurement (ASTM).

Example embodiments have been illustrated and described herein, and although specific terms have been employed, they are used and are to be interpreted in a generic and descriptive sense only and not for purposes of limitation. In some instances, as would be apparent to those of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it is understood that various modifications, changes and alterations can be made to the described embodiments without departing from the spirit and scope of the invention, as defined in the following claims.

What is claimed is:

1. A polarizing plate comprising:
   a polarizer; and
   a protective layer formed directly on a surface of the polarizer, the protective layer being formed from a composition for protective layers of polarizing plates comprising:
   (A) a photocurable monomer or oligomer having a glass transition temperature (Tg) of about 50° C. or greater and comprising at least one of tripropylene glycol di(meth)acrylate, tris(2-hydroxyethyl)isocyanurate di(meth)acrylate, dipropylene glycol di(meth)acrylate, bisphenol A di(meth)acrylate, hydroxypivalic acid neopentyl glycol di(meth)acrylate, polypropylene glycol di(meth)acrylate, tetraethylene glycol di(meth)acrylate, and tricyclodecane dimethanol di(meth)acrylate;
   (B) particles, the particles being present in the protective layer in an amount of about 5 wt % to about 40 wt %;
   (C) a reactive monomer or oligomer comprising at least one of (C1) an acrylic monomer or oligomer having at least one hydrophilic group, and (C2) an acrylic monomer or oligomer having at least two (meth)acryloyl groups; and
   (D) an initiator,
   the protective layer having a thickness of 1 μm to 30 μm and being a single layer,
   wherein the protective layer has a storage modulus at about 25° C. of greater than about 2000 MPa, as measured at a heating rate of 10° C./min, a temperature of −50° C. to 100° C., a frequency of 1 Hz, and a strain of 0.5%.

2. The polarizing plate according to claim 1, wherein the protective layer has a modulus at about 25° C. of greater than about 2000 MPa to about 3900 MPa, as measured at a heating rate of 10° C./min, a temperature of −50° C. to 100° C., a frequency of 1 Hz, and a strain of 0.5%.

3. The polarizing plate according to claim 1, wherein the protective layer has a haze of about 0.001% to about 5% at a wavelength of about 300 nm to about 700 nm.

4. The polarizing plate according to claim 1, wherein the particles have an average particle diameter (D50) of about 1 nm to about 50 nm.

5. The polarizing plate according to claim 1, wherein the particles comprise non-core-shell type inorganic particles.

6. The polarizing plate according to claim 1, wherein the particles comprise at least one of silica ($SiO_2$), aluminum oxide ($Al_2O_3$), calcium carbonate, barium sulfate, titanium dioxide, aluminum hydroxide, talc, magnesium oxide, and zinc oxide.

7. The polarizing plate according to claim 1, wherein the composition for protective layers of a polarizing plate comprises: about 20 parts by weight to about 80 parts by weight of the (A) photocurable monomer or oligomer having a glass transition temperature (Tg) of about 50° C. or greater; about 5 parts by weight to about 40 parts by weight of the (B) particles; and about 5 parts by weight to about 60 parts by weight of the (C) reactive monomer or oligomer, based on 100 parts by weight of (A)+(B)+(C).

8. The polarizing plate according to claim 1, wherein the (C2) acrylic monomer or oligomer having at least two (meth)acryloyl groups comprises an acrylic monomer or oligomer having at least three (meth)acryloyl groups.

9. The polarizing plate according to claim 1, further comprising an optical film formed on an other surface of the polarizer.

10. The polarizing plate according to claim 9, wherein a ratio (D2/D1) of a thickness D2 of the protective layer to a thickness D1 of the optical film ranges from about 2:3 to about 1:10.

11. A composition for protective layers directly formed on a surface of a polarizer of a polarizing plate, the protective layer being a single layer, the composition comprising:
    (A) a photocurable monomer or oligomer having a glass transition temperature (Tg) of about 50° C. or greater and comprising at least one of tripropylene glycol di(meth)acrylate, tris(2-hydroxyethyl)isocyanurate di(meth)acrylate, dipropylene glycol di(meth)acrylate, bisphenol A di(meth)acrylate, hydroxypivalic acid neopentyl glycol di(meth)acrylate, polypropylene glycol di(meth)acrylate, tetraethylene glycol di(meth)acrylate, and tricyclodecane dimethanol di(meth)acrylate;
    (B) particles having a particle diameter of about 1 nm to about 50 nm, the particles being present in the protective layer in an amount of about 5 wt % to about 40 wt %;
    (C) a reactive monomer or oligomer comprising (C1) an acrylic monomer or oligomer having at least one hydrophilic group; and
    (D) an initiator,
    wherein the composition after curing has a storage modulus at about 25° C. of greater than about 2000 MPa to about 3900 MPa, as measured at a heating rate of 10° C./min, a temperature of −50° C. to 100° C., a frequency of 1 Hz, and a strain of 0.5%.

12. The composition for protective layers of a polarizing plate according to claim 11, comprising:
    about 20 parts by weight to about 80 parts by weight of the (A) monomer or oligomer having a glass transition temperature (Tg) of about 50° C. or greater;
    about 5 parts by weight to about 40 parts by weight of the (B) particles;
    about 5 parts by weight to about 60 parts by weight of the (C) reactive monomer or oligomer comprising the (C1) acrylic monomer or oligomer having the at least one hydrophilic group; and about 0.1 parts by weight to about 10 parts by weight of the (D) initiator, based on 100 parts by weight of (A)+(B)+(C).

13. An optical display comprising the polarizing plate according to claim 1.

14. An optical display comprising a protective layer formed from the composition for protective layers of a polarizing plate according to claim 11.

* * * * *